United States Patent
Gao et al.

(10) Patent No.: US 11,669,426 B2
(45) Date of Patent: Jun. 6, 2023

(54) KERNEL-BASED POWER CONSUMPTION AND ISOLATION AND DEFENSE AGAINST EMERGING POWER ATTACKS

(71) Applicant: International Business Machines Corporation, Armonk, NY (US)

(72) Inventors: Xing Gao, Williamsburg, VA (US); Zhongshu Gu, Croton-on-Hudson, NY (US); Mehmet Kayaalp, White Plains, NY (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 15/638,694

(22) Filed: Jun. 30, 2017

(65) Prior Publication Data

US 2019/0004917 A1 Jan. 3, 2019

(51) Int. Cl.
*G06F 11/30* (2006.01)
*G06F 1/3203* (2019.01)
(Continued)

(52) U.S. Cl.
CPC ........ *G06F 11/3062* (2013.01); *G06F 1/3203* (2013.01); *G06F 1/3234* (2013.01);
(Continued)

(58) Field of Classification Search
None
See application file for complete search history.

(56) References Cited

U.S. PATENT DOCUMENTS 9,268,382 B2 * 2/2016 Page ................ G06F 1/26
9,292,060 B1 * 3/2016 Marr ............... G06F 1/3203
(Continued)

FOREIGN PATENT DOCUMENTS

GB    2345229 A    6/2000
JP    2006340347 A   12/2006

OTHER PUBLICATIONS

Shen, et al. "Power containers: an OS facility for fine-grained power and energy management on multicore servers." ACM SIGPLAN Notices 48, No. 4 (2013): 65-76 (Year: 2013).*
(Continued)

*Primary Examiner* — Bijan Mapar
(74) *Attorney, Agent, or Firm* — Jeffrey S. LaBaw; David H. Judson

(57) ABSTRACT

A system and method for achieving power isolation across different cloud tenants and workloads is provided. The system includes a model of per-workload power consumption and an approach for attributing power consumption for each container. It allows a cloud provider to detect abnormally high power usage caused by specific containers and/or tenants, and to neutralize the emerging power attacks that exploit information leakages in the public container cloud. The approach also enables the provider to bill tenants for their specific power usage. Thus, the technique herein provides a mechanism that operates to attribute power consumption data for each container to defend against emerging power attacks, as well as to make it feasible to develop a cloud billing model based on power usage. The mechanism defends against emerging power attacks in container cloud offerings by implementing in a power-based namespace workflow in an OS kernel. The namespace workflow partitions the power consumption information for each container.

20 Claims, 5 Drawing Sheets

(51) Int. Cl.

| | | |
|---|---|---|
| *G06F 1/3234* | (2019.01) | |
| *G06F 21/81* | (2013.01) | |
| *G06F 21/53* | (2013.01) | |
| *G06F 9/455* | (2018.01) | |
| *G06F 11/34* | (2006.01) | |
| *G06F 21/75* | (2013.01) | |
| *G06F 1/3206* | (2019.01) | |
| *G06F 1/3296* | (2019.01) | |
| *H04L 9/40* | (2022.01) | |

(52) U.S. Cl.
CPC ......... *G06F 9/455* (2013.01); *G06F 9/45558* (2013.01); *G06F 11/3447* (2013.01); *G06F 21/53* (2013.01); *G06F 21/755* (2017.08); *G06F 21/81* (2013.01); *G06F 1/3206* (2013.01); *G06F 1/3296* (2013.01); *G06F 2009/45587* (2013.01); *H04L 63/1441* (2013.01)

(56) References Cited

U.S. PATENT DOCUMENTS

| | | | | |
|---|---|---|---|---|
| 9,310,864 | B1* | 4/2016 | Klein | G06F 1/26 |
| 9,547,353 | B1* | 1/2017 | Marr | G06F 9/30083 |
| 10,101,787 | B1* | 10/2018 | Bailey | G06F 1/3206 |
| 2011/0213997 | A1* | 9/2011 | Kansal | G06F 1/3234 |
| | | | | 713/324 |
| 2012/0123739 | A1* | 5/2012 | Sethumadhavan | |
| | | | | G06F 11/3466 |
| | | | | 702/186 |
| 2012/0239323 | A1* | 9/2012 | McGrane | G06F 1/3206 |
| | | | | 702/62 |
| 2012/0260117 | A1* | 10/2012 | Acar | G06F 1/3243 |
| | | | | 713/340 |
| 2014/0149752 | A1* | 5/2014 | Brock | G06F 1/3206 |
| | | | | 713/300 |
| 2016/0179184 | A1* | 6/2016 | Shah | G06F 1/3206 |
| | | | | 713/320 |
| 2016/0277180 | A1 | 9/2016 | Wang et al. | |
| 2017/0279697 | A1* | 9/2017 | Katsaros | H04L 41/142 |
| 2018/0336351 | A1* | 11/2018 | Jeffries | G06F 21/566 |
| 2019/0041960 | A1* | 2/2019 | Guim Bernat | G06F 1/3234 |
| 2021/0263779 | A1* | 8/2021 | Haghighat | G06F 11/3419 |

OTHER PUBLICATIONS

Aderholdt, et al. "Review of enabling technologies to facilitate secure compute customization." Oak Ridge National Laboratory, Oak Ridge, Tennessee, USA, ORNL/TM-2015/210 (2014). 58 pages (Year: 2014).*

Wikipedia Contributors, 'Perf (Linux)', Wikipedia, The Free Encyclopedia, Apr. 20, 2017, 16:10 UTC, <https://en.wikipedia.org/w/index.php?title=Perf_(Linux)&oldid=776371132> [accessed Oct. 1, 2019]. 3 pages (Year: 2017).*

Almeida, et al. "Energy measurement tools for ultrascale computing: A survey." Supercomputing frontiers and innovations 2, No. 2 (2015): 64-76 (Year: 2015).*

Ferroni, et al. "Enabling power-awareness for the xen hypervisor." ACM SIGBED Review 15, No. 1 (2018): 36-42 (Year: 2018).*

Gao, et al. "ContainerLeaks: Emerging security threats of information leakages in container clouds." In 2017 47th Annual IEEE/IFIP International Conference on Dependable Systems and Networks (DSN), pp. 237-248. IEEE, 2017 (Year: 2017).*

Georgiou, et al. "Energy accounting and control with SLURM resource and job management system." In International Conference on Distributed Computing and Networking, pp. 96-118. Springer, Berlin, Heidelberg, 2014 (Year: 2014).*

Grattafiori, Aaron. "Understanding and hardening linux containers." Whitepaper, NCC Group (2016). 123 pages (Year: 2016).*

Wikipedia Contributors, 'Principle of least privilege', Wikipedia, The Free Encyclopedia, Jun. 18, 2017, 18:22 UTC, <https://en.wikipedia.org/w/index.php?title=Principle_of_least_privilege&oldid=786321832> [accessed Oct. 1, 2019]. 5 pages (Year: 2019).*

Zhai, et al. "Happy: Hyperthread-aware power profiling dynamically." In 2014 {USENIX} Annual Technical Conference ({USENIX} {ATC} 14), pp. 211-217. 2014 (Year: 2014).*

Aravinda Prasad, perf: Container-aware tracing support, message for linux kernel patch, Jun. 14, 2016, 2 pages, obtained from https://lwn.net/Articles/691298/ on May 8, 2021 (Year: 2016).*

Mantel, Heiko, Johannes Schickel, Alexandra Weber, and Friedrich Weber. "Vulnerabilities Introduced by Features for Software-based Energy Measurement." (2017) (Year: 2017).*

Guo, Liwei, Tiantu Xu, Mengwei Xu, Xuanzhe Liu, and Felix Xiaozhu Lin. "Power sandbox: Power awareness redefined." In Proceedings of the Thirteenth EuroSys Conference, pp. 1-15. 2018 (Year: 2018).*

* cited by examiner

KERNEL-BASED POWER CONSUMPTION AND ISOLATION AND DEFENSE AGAINST EMERGING POWER ATTACKS

STATEMENT REGARDING SPONSORED RESEARCH

This invention was made with Government support under Contract No. D15PC00187 awarded by Department of Homeland Security. The Government has certain rights in this invention.

BACKGROUND OF THE INVENTION

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Currently, cloud computing services cannot attribute power consumption to different workloads (virtual machines, containers, etc.) and hence, it is not possible to charge tenants for their power consumption. In a cloud environment, this implies two problems: tenants with low power consumption may be charged relatively more to compensate for tenants with high power consumption, and malicious tenants could increase power consumption unimpeded to the point where they can launch power denial of service attacks. These types of denial of service attacks have been identified as serious threats to the reliability of data centers, especially for public cloud infrastructures. Indeed, often the ultimate goal of power attackers is to trip the branch circuit breakers with some specially-crafted power-intensive workloads, often referred to as "power viruses." The tripping of circuit breakers can lead to the shutdown of servers, and eventually the interruption of cloud services.

With the introduction of enhanced power capping techniques at both the individual host level and Power Distribution Unit (PDU) level, it becomes harder for attackers to shut down servers just by running a "power virus" on a randomly-selected computer system or time interval. Thus, for attackers, choosing a more effective attack strategy becomes important. Attackers can amplify their effects, e.g., by involving strategies such as: superimposing their power workloads on benign power usage peaks, aggregating their resources to target a set of adjacent servers associated with a common circuit breaker, and synchronizing power attacks with precise timing to maximize the chance of generating a power spike. To achieve these strategies, however, attackers need to exploit information leakages in current cloud environments, especially the power consumption information of the host. In particular, it is known that in container cloud settings, applications within a container are able to read the power consumption of their host machine. This provides a potential attack vector that the prior art has not addressed.

There remains a need to provide a mechanism for per-container power accounting in a cloud compute environment.

BRIEF SUMMARY

According to this disclosure, a system and method for achieving power isolation across different cloud tenants and workloads in a multi-tenant cloud compute environment is provided. In this approach, a control host machine executes an operating system, such as the Linux kernel. The operating system kernel provides a virtualization method to instantiate and execute multiple isolated "containers" within the kernel. Individual containers are associated with particular tenants within the cloud compute environment, and a particular tenant application is executed in a container. According to the disclosure, the operating system kernel is further configured with a dedicated power management namespace, which isolates and virtualizes system resources reflecting power consumption data. In particular, using the namespace, power usage data from each container is modeled based on per-container performance usage data, and one or more models for power consumption approximations are computed. The model(s) are then used to enable power consumption per container to be isolated and thus attributed for each container. While an administrator may obtain power usage data for the host as a whole, individual applications within the containers (the containerized applications) are not able to access that data. This system allows a cloud provider to detect abnormally high power usage caused by specific containers and/or tenants, and to neutralize the emerging power attacks that exploit information leakages in the public container cloud.

This approach also enables the provider to bill tenants for their specific power usage. Thus, the technique herein provides a mechanism that operates both to attribute power consumption data for each container to defend against emerging power attacks, as well as to make it feasible to develop a cloud billing model based on power usage.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
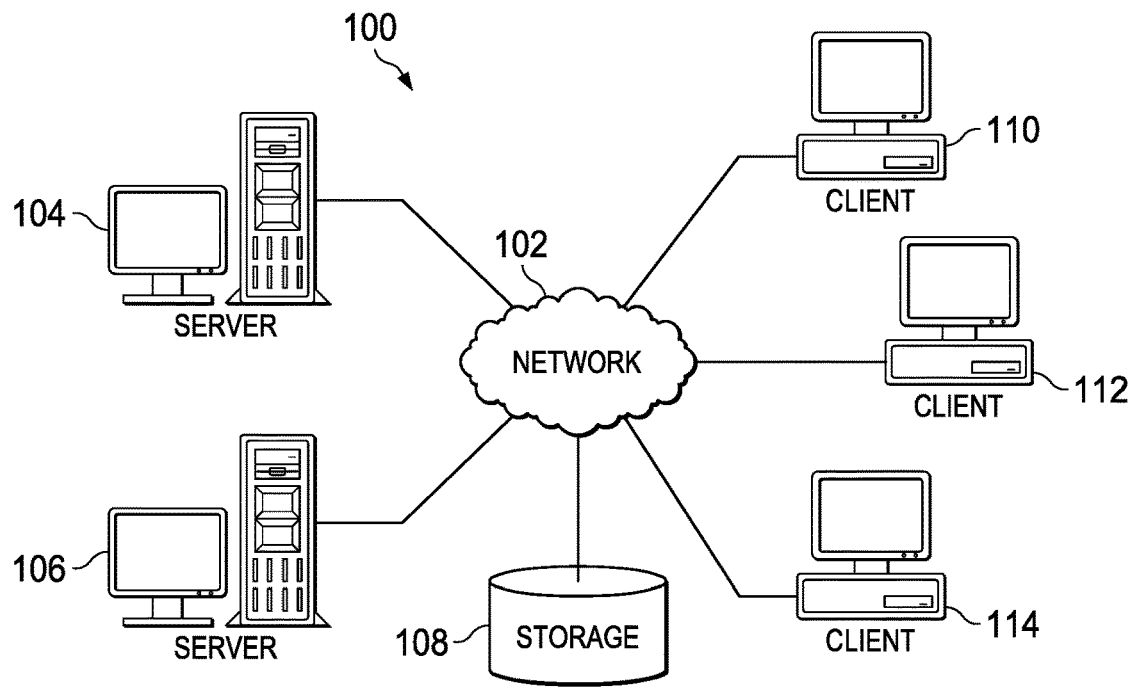
FIG. 1 depicts an exemplary block diagram of a distributed data processing environment in which exemplary aspects of the illustrative embodiments may be implemented.
Figure 2:
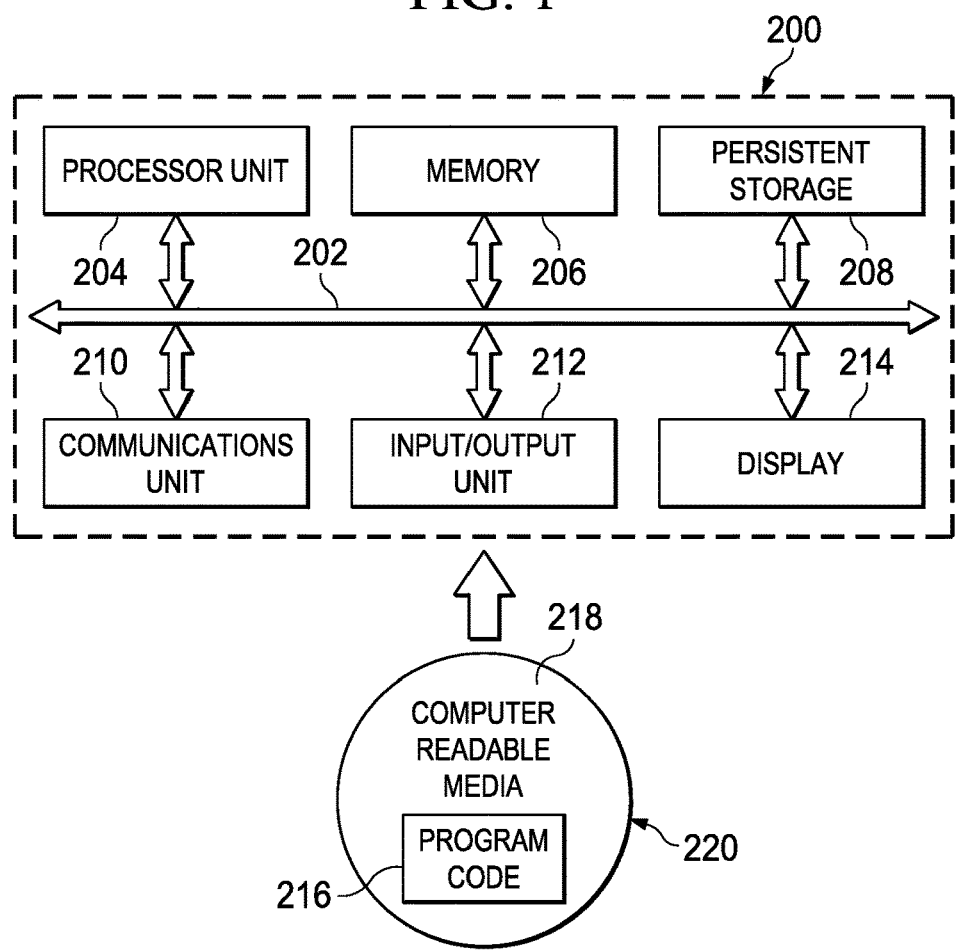
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
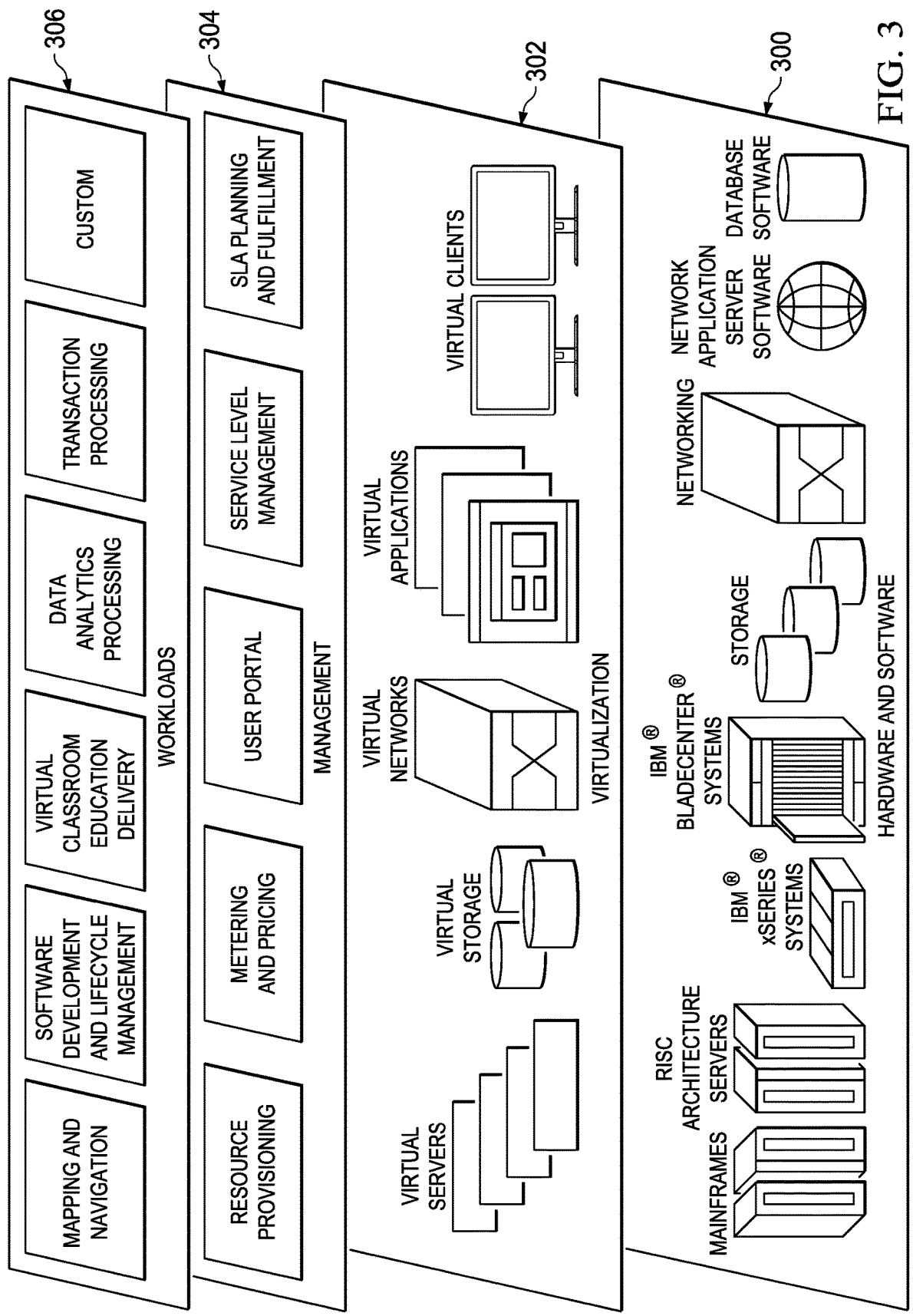
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
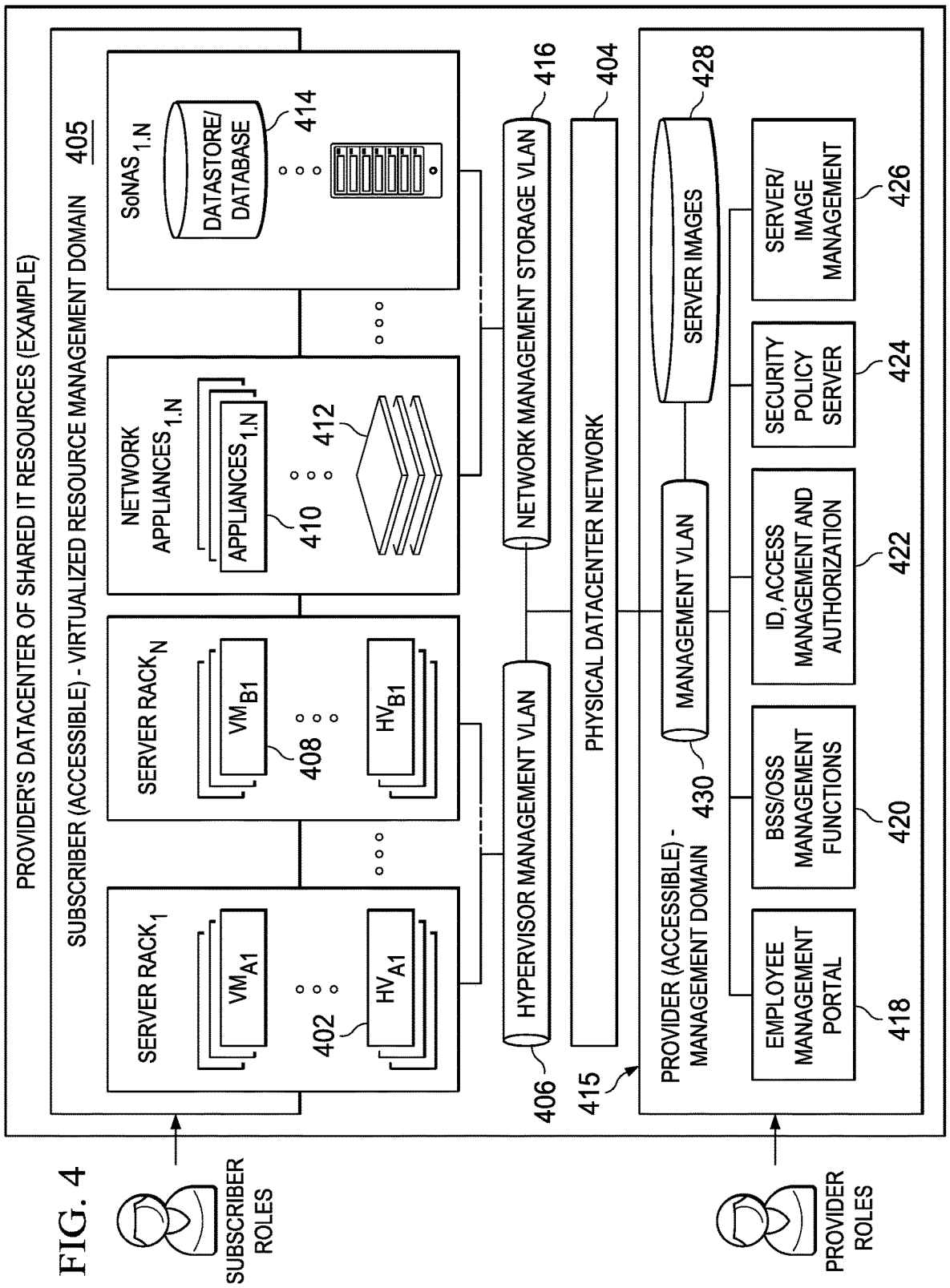
FIG. 4 depicts an exemplary data center in which the techniques of this disclosure may be implemented.

FIG. 4 illustrates a typical IT infrastructure that supports virtualization of resources and in which the below-described techniques of this disclosure may be implemented. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

In a representative container cloud compute environment, a host executes an operating system (OS), such as the Linux kernel. Containers refers to an operating-system-level virtualization method for running multiple isolated computing workloads (containers) on a control host using a single operating system kernel. The approach effectively partitions the resources managed by the single operating system into isolated groups to better balance the conflicting demands on resource usage between the isolated groups. In contrast to virtualization, neither instruction-level emulation nor just-in-time compilation is required. In addition, containers can run instructions native to the core CPU without any special interpretation mechanisms. By providing a way to create and enter containers, an operating system gives applications the illusion of running on a separate machine while at the same time sharing many of the underlying resources.

The Linux kernel has a feature referred to as Namespaces. A namespace isolates and virtualizes system resources for a collection of processes. Some examples of resources that can be virtualized include process IDs, hostnames, user IDs, and the like. A namespace typically refers to namespace types, as well as to specific instances of these types. A Linux operating system is initialized with a single instance of each namespace type. After initialization, additional namespaces can be created or joined.

The Linux kernel also provides a functionality called cgroups that allows limitation and prioritization of resources (CPU, memory, block I/O, network, etc.). Container technology combines the kernel's support of cgroups and namespaces to provide isolated execution environments for applications.

Computing infrastructures such as described above are increasingly designed to optimize their power consumption. To this end, some techniques trade-off performance for energy efficiency by lowering the voltage and frequency, while other techniques cut the power of idle components or put them in different levels of sleep modes. Modern computing systems can turn off idle components in various granularities, from spinning down hard disks and putting network cards in sleep mode, all the way down to power- or clock-gating data-paths and memory blocks of the processor. As a result, total power consumption of a computing system executing a workload can be reduced or otherwise controlled. Moreover, because the idleness of individual components within the processor is difficult to know without knowing extensive details of the design and/or performing a precise simulation, estimating the power consumption for a given system/workload is non-trivial.

Another technique used in data center design is power oversubscription. In particular, the variation of power consumption makes it difficult to build a large data center with an efficient power distribution infrastructure. The maximum power requirement for all the servers in a data center is the total of all maximum power consumption values of each component of each server. The maximum power, however, is almost never consumed for all components of all servers at the same time. Therefore, an efficient power delivery architecture typically is designed with power oversubscription, where power is provisioned as a hierarchy, where the aggregate power delivery at each level is only a fraction of the maximum power consumption of the levels below. This fraction is determined based on the power consumption values that are typically observed when operating the servers. A marginal power delivery capacity might be added for safety.

Another known technique is power capping. To prevent overloading the power delivery infrastructure when an atypical power consumption level is reached, recent processors and servers include power capping mechanisms that can associate a dynamic maximum power consumption setting for the processors. Voltage and amperage meters implemented in processor hardware can report their power measurements to the software for implementing a control loop. Some primitive controls may be implemented as part of the microcode or system management code, while more advanced controls may be implemented in the firmware (BIOS, etc.) and in the operating system. Latest such power capping mechanism of Intel processors, called Running Average Power Limit, can report the power consumption for several "power planes" of the processor. The power consumption of all execution cores, however, is reported as one of the power planes as an aggregate, and it is not trivial to attribute it to individual cores and back to the owner of the workloads in a multi-tenant cloud computing setting.

Kernel-Based Power Consumption Isolation and Defense Against Emerging Power Attacks With the above as background, the subject matter of this disclosure is now described. In a representative container cloud compute environment, and with reference now to FIG. 5, a host machine 500 executes an operating system (OS) 501, such as the Linux kernel. The operating system provides an OS-level virtualization method (depicted at 502) for running multiple isolated computing workloads (containers). The Linux kernel 501 has a feature referred to as Namespaces. A namespace isolates and virtualizes system resources for a collection of processes. Some examples of resources that can be virtualized include process IDs, hostnames, user IDs, and the like. A namespace typically refers to namespace types, as well as to specific instances of these types. A Linux operating system is initialized with a single instance of each namespace type. After initialization, additional namespaces can be created or joined. The Linux kernel 501 also provides a functionality called cgroups that allows limitation and prioritization of resources (CPU, memory, block I/O, network, etc.). Container technology combines the kernel's support of cgroups and namespaces to provide isolated execution environments for applications.

As depicted, each container 504 hosts one or more applications 505. The containers approach effectively partitions the resources managed by the single operating system into isolated groups to better balance the conflicting demands on resource usage between the isolated groups. In contrast to virtualization, neither instruction-level emulation nor just-in-time compilation is required. In addition, containers can run instructions native to the core CPU of the host without any special interpretation mechanisms. By providing a way to create and enter containers, the operating system 501 gives applications 505 the illusion of running on a separate machine while at the same time sharing many of the underlying resources.

A particular container 504 (and its associated application 505) typically is associated with just a single tenant in the cloud compute environment, and as noted a container may host one or more of the tenant's applications.

As also depicted, the operating system 501 has associated therewith an RAPL driver 506. The RAPL driver is a kernel module running on the host that provides an ability to monitor power consumption. A Linux cgroup cpuacct 508 generates automatic reports on CPU resources for a group of tasks. A perf_event cgroup 510 is used by a Linux performance monitoring tool (Perf) to read performance statistics for a group of tasks. The RAPL driver 506 is shared by all of the containers 504. Each container has associated therewith an RAPL interface 512. The RAPL interface in each container is a user-kernel sysfs interface, and it is designed for users to read power usage. As will be described below, in a preferred embodiment the RAPL interfaces 512 are unchanged, but the RAPL driver 506 is modified to provide the desired functionality. These modifications, however, are transparent to the containers.

According to this disclosure, the application 505 in each container 504 reads the power usage in its respective RAPL interface 512 mounted in the container. As depicted, a read operation is directed from the RAPL interface 512 to the RAPL driver 506 in the kernel. When a read occurs, preferably the whole-system power usage, however, is not returned to the application inside the container; rather, the approach herein is to have per-container performance data collected (by the RAPL driver 506) from cpuaccount 508 and perf_event 510 cgroups to approximate the per-container power usage. It is the per-container power usage that is then returned to the application. In other words, the applications inside a container can only read the power usage of their own resident container.

Figure 5:
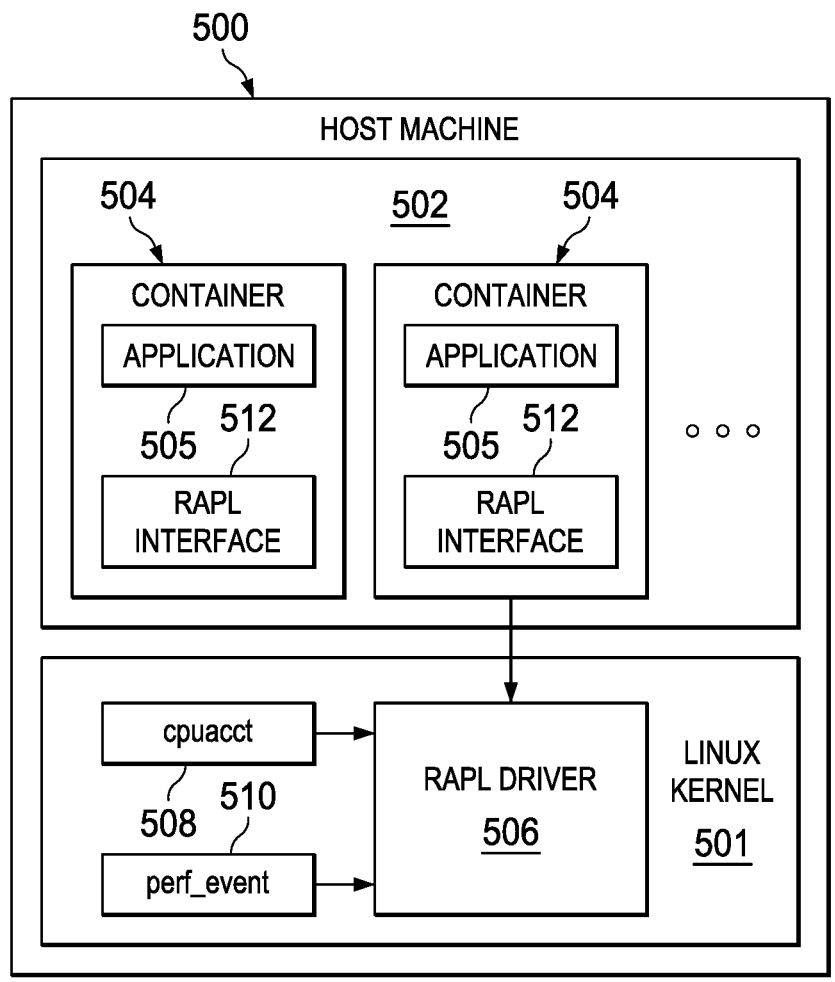
FIG. 5 depicts a host machine that executes an operating system (OS) kernel, which provides an OS-level virtualization method for running multiple isolated computing workloads (containers) and in which the teachings of this disclosure may be practiced.
Figure 6:
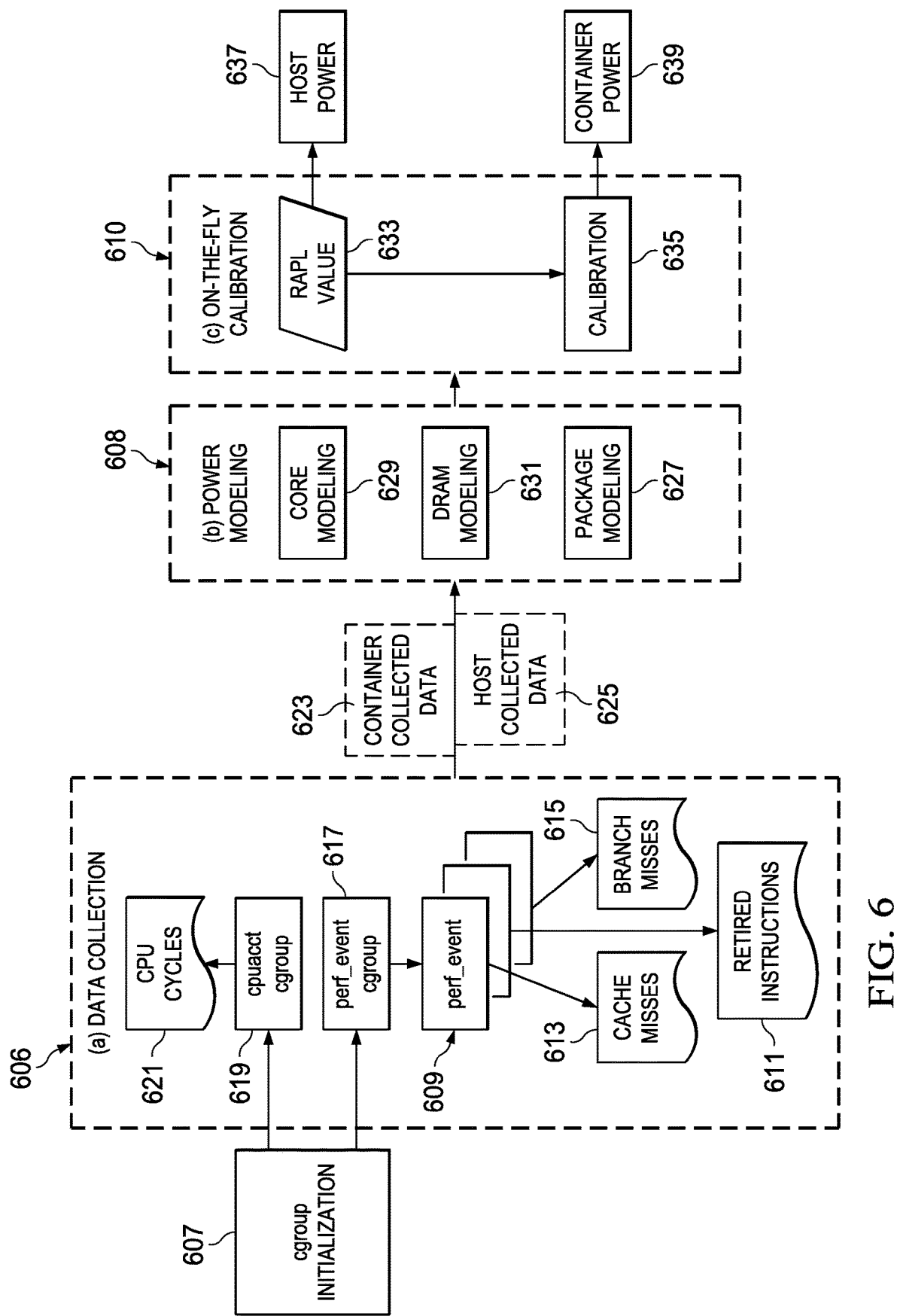
FIG. 6 illustrates an exemplary power-based namespace workflow of this disclosure.

FIG. 6 depicts a power-based namespace workflow according to this disclosure. The workflow is implemented in a host machine (e.g., FIG. 5) in association with a cloud compute environment, such as depicted in FIG. 3 and implemented in a physical data center environment such as shown in FIG. 4. This environment typically will be multi-tenant, and of course there may be variations in the particular implementation.

According to this disclosure, emerging power attacks in container cloud offerings are defended by implementing in the operating system (OS) kernel a power-based namespace. The namespace partitions the power consumption information for each container. In this manner, each container can only retrieve the power usage data for itself. As a corollary, the mechanism ensures that host power consumption (in the aggregate) cannot be leaked. Without the host power consumption information being available (i.e. leaked), attackers are not able to infer the whole-system power state of the host. Thus, the power-based namespace approach of this disclosure eliminates an attacker's chance of superimposing power-intensive workload on benign power peaks. Moreover, with per-container power usage available, the host can take container-specific power consumption into account and thereby adjust system resources dynamically. Thus, in addition to providing enhanced security advantages (e.g., against power viruses and other potential attacks), the maintenance of per-container power usage data also enables the host to associate different usage fees for containers. This enables administrators to design a finer-grained billing model based on power consumption of each container.

According to the technique herein, power consumption isolation and defense is provided using a workflow of a power-based namespace that is implemented in the RAPL driver 506 (FIG. 5). The workflow comprises three components (stages), namely: a data collection component 606, a power modeling component 608, and an on-the-fly calibration component 610. As noted above, these RAPL driver modifications do not impact the RAPL interface (FIG. 5, at 512), which is maintained within each container 504 and that makes the driver modifications (and the workflow of the namespace) transparent to the containerized applications.

In this workflow, preferably the Linux kernel 501 functions that handle read operations on energy usages are modified by the components 606, 608 and 610. In particular, once detecting a power usage read operation (initiated from an RAPL interface 512), the shared RAPL driver 506 retrieves per-container performance data (using data collection 606), uses the retrieved data to model the energy usage (using the power modeling 608 component), and calibrates the modeled energy usage (using the on-the-fly calibration 610). Each of the components are described in detail below.

Typically, each component 606, 608 and 610 is implemented in software as a set of computer program instructions executed in one or more hardware processors. While the following describes these components as being distinct, this is not a requirement, as one of more of the components may be combined or otherwise integrated, and one or more of the functions described may be shared or otherwise implemented in or across the components (or other subsystems associated with the kernel or otherwise).

The following describes a representative data collection component 606. To model per-container power consumption, the fine-grained performance data for each container is collected. In the embodiment depicted, the performance events from the initialization of a container (via cgroup initialization 607) are monitored and used to create multiple perf events 609, each associated with a specific performance event type (e.g., retired instructions 611, cache misses 613, branch misses 615, etc.) and a specific CPU core. During data collection, the perf_event cgroup 617 of this container is then connected with these perf events 609 to start accounting. The system also records the CPU cycles 621 by using cpuaccount 619 to compute cache miss rate and branch miss rate. In addition, preferably the owner of all created perf events is configured in such a manner (e.g., as TASK_TOMBSTONE in Linux) indicating that such performance accounting is decoupled from any user process. The output(s) of the data collection component comprise container collected data 623 and host collected data 625. These outputs are then provided to the power modeling component 608.

The following describes a representative power modeling component 608. To implement the workflow of the power-based namespace, as noted above the power consumption is attributed to each container is partitioned. Instead of providing transient power consumption, the RAPL driver offers accumulated energy usages for package 627, core 629, and DRAM 631, respectively. Preferably, the power consumption is calculated by measuring energy consumption over a unit time window. The workflow of the power-based namespace also provides accumulative per-container energy data, preferably in the same format as in the original RAPL interface. In one embodiment, the power consumption for the core is attributed using the core modeling 629. Preferably, retired instructions 611, cache miss rate 613, and branch miss rate 615 (provided from the data collection component) are included to build a multi-degree polynomial model to represent the power consumption for the core modeling 629. For the DRAM modeling 631, preferably the number of cache misses 613 is used to profile the energy. For the package power consumption modeling 627, preferably the value of core and DRAM are summed. Other computations may be used as well. The output of the power modeling component 608 is then provided to the on-the-fly calibration component 610.

The following describes an embodiment of the on-the-fly calibration component 610. In one embodiment, the component models 610 the energy data for the host, and then cross-validates it with the actual energy data acquired through the RAPL 633. Then, the modeled host power consumption data is used to calibrate the container's power consumption. Preferably, this on-the-fly calibration 635 is conducted for each read operation to the RAPL driver, although this is not a limitation. The outputs of this component are the host power consumption data 637 and the per-container power data 639.

According to this disclosure, while the host power consumption data 637 is available to the operating system kernel to facilitate one or more management or accounting-related functions, such as per-container invoicing, the host power consumption data 637 is not available to the individual containers (and the one or more tenant applications therein). Because the host power consumption information is not available to be leaked (e.g., from any container), potential attackers are not able to infer the whole-system power state of the host On the other hand, the per-container power data 539 is available to a container, but a container only has knowledge of the power data for that container, and not for any other ones of the containers.

The data collection, power modeling and on-the-fly components depicted in FIG. 6 and described above provide a system and method for achieving power isolation across different cloud tenants and workloads. The power modeling component 608 provides a model of per-workload power consumption, and the on-the-fly calibration component 610 attributes power consumption for each container. The namespace allows a cloud provider to detect abnormally high power usage caused by specific containers and/or tenants, and thus to neutralize the emerging power attacks that might otherwise exploit information leakages in the public container cloud. As a convenient by-product of the namespace, the approach also enables the provider to invoice tenants for their specific power usage, as the provider is able to access the power usage data for the host as a whole. Thus, the technique herein provides a mechanism that operates to attribute power consumption data for each container to thereby defend against emerging power attacks, as well as to make it feasible to develop a cloud billing model based on power usage. Generalizing, the above-described mechanism defends against emerging power attacks in container cloud offerings by implementing in a power-based namespace in an OS kernel.

As noted above, the workflow of the power-based namespace partitions the power consumption information for each container. In this manner, each container can only retrieve the power usage data for itself. As a corollary, the mechanism ensures that host power consumption (in the aggregate) cannot be leaked because such information is not available to application(s) executing within or in association with a container. Without the host power consumption information being available (i.e. leaked), potential attackers are not able to infer the whole-system power state of the host. Thus, the workflow of the power-based namespace approach of this disclosure eliminates an attacker's chance of superimposing power-intensive workload on benign power peaks. Moreover, with per-container power usage available, the host can take container-specific power consumption into account and thereby adjust system resources dynamically. Thus, in addition to providing enhanced security advantages (e.g., against power viruses and other potential attacks), the maintenance of per-container power usage data also enables the host to associate different usage fees for containers. This enables administrators to design a finer-grained billing model based on power consumption of each container.

The particular technique, method, process, system or device to mitigate an emerging power attack may vary and will depend on the nature of the attack. Such functions are well-known in the prior art and may be incorporate herein as necessary to implement an appropriate mitigation strategy based on the information collected by the namespace. In this regard, it is known in the art to configure or provision cloud architectures such as described above to include mechanisms and systems that provide cloud security capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others. One or more of these techniques may be utilized to facilitate mitigation where necessary.

As described, the technique of this disclosure preferably is implemented within the operating system kernel itself. While this is preferred, it is not necessarily limiting, as the workflow might also be implemented as one or more applications (whether in user space or otherwise). Generalizing, one of ordinary skill in the art will recognize that the above-described workflow may be implemented (as a product or service) within or in association with a cloud platform system or appliance, or using any other type of cloud management systems, products, devices, programs or processes. As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The workflow may be implemented by a cloud service provider that operates infrastructure for a private cloud, a public cloud, or a hybrid cloud. It may be available as a managed service provided by a cloud service or some other service provider.

The components may implement the workflow synchronously or asynchronously, continuously and/or periodically.

The subject matter herein provides significant advantages. As noted, the approach described herein targets power attacks that are a form of denial of service attack in the cloud computing settings. This approach addresses the scenario wherein attackers could otherwise exploit the system vulnerabilities to disrupt the cloud services, e.g., by launching power-intensive workloads. The approach advantageously provides per-tenant power consumption in the cloud environment to eliminate denial-of-service attacks that trigger high power spikes.

The techniques herein may be extended to other cloud models including PaaS and IaaS.

While a preferred operating environment and use case (a cloud appliance or platform) has been described, the techniques herein may be used in any other operating environment in which it is desired to deploy applications or other services while enforcing a given security context.

The approach may be integrated with other security methods and systems, such as in a SIEM, or the like.

As has been described, the functionality described above may be implemented as a standalone approach, e.g., one or more software-based functions executed by one or more hardware processors, or it may be available as a managed service (including in association with a web service via a SOAP/XML interface). The particular hardware and software implementation details (namely, using the Linux kernel) described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, log management solutions and cloud computing environments, as well as improvements to the functioning of cloud security facilities and systems.

Having described our invention, what we claim is as follows.

The invention claimed is:

1. A method operative in a multi-tenant cloud compute system host machine, comprising:
  providing an operating system kernel that executes, as a native operating system virtualization method, a set of containers that share the operating system kernel;
  configuring the operating system kernel with a power management namespace that isolates and virtualizes system resources reflecting power consumption data;
  using the power management namespace to defend the host machine against a power-based attack vector or to associate an amount of power consumption to a particular tenant by:
    collecting per-container performance data and, for each container associated with the power management namespace, computing a per-container power usage; and
    responsive to a read request initiated from a particular container and directed to a power consumption kernel module of the operating system, the power consumption kernel module being shared by each container in the set of containers, calibrating the per-container power usage computed from the per-container performance data against a model of host machine power consumption to generate a calibrated per-container power usage, the power consumption kernel module returning the calibrated per-container power usage for the particular container and withholding power consumption information about any other container in the set;
  wherein power consumption information for the particular container is available to the particular container, but not any other container in the set.

2. The method as described in claim 1 wherein the per-container performance data is collected from cpuacct and perf_event cgroups to approximate the per-container power usage.

3. The method as described in claim 2 wherein the per-container power usage is computed based on accumulated energy usages over a time window and using one or more models of energy usage.

4. The method as described in claim 3 wherein the one or more models are one of: a core usage model, a package usage model, and a memory usage model.

5. The method as described in claim 4 further including modeling power consumption information for the host machine.

6. The method as described in claim 1, wherein associating an amount of power consumption to a particular tenant facilitates an invoicing operation for the particular tenant's usage of the multi-tenant cloud compute system.

7. The method as described in claim 1 the operating system kernel is Linux, and the read request is initiated from a Running Average Power Limit (RAPL) module that is modified to provide the collecting, computing and withholding.

8. Apparatus operative as a multi-tenant cloud compute system host machine, comprising:
a hardware processor;
computer memory holding computer program instructions executed by the processor-fa, the computer program instructions comprising program code configured to:
provide an operating system kernel that executes, as a native operating system virtualization method, a set of containers that share the operating system kernel;
configure the operating system kernel with a power management namespace that isolates and virtualizes system resources reflecting power consumption data;
use the power management namespace to defend the host machine against a power-based attack vector or to associate an amount of power consumption to a particular tenant by:
collecting per-container performance data and, for each container associated with the power management namespace, computing a per-container power usage; and
responsive to a read request initiated from a particular container and directed to a power consumption kernel module of the operating system, the power consumption kernel module being shared by each container in the set of containers, calibrating the per-container power usage computed from the per-container performance data against a model of host machine power consumption to generate a calibrated per-container power usage, the power consumption kernel module returning the calibrated per-container power usage for the particular container and withholding power consumption information about any other container in the set;
wherein power consumption information for the particular container is available to the particular container, but not any other container in the set.

9. The apparatus as described in claim 8 wherein the per-container performance data is collected from cpuacct and perf_event cgroups to approximate the per-container power usage.

10. The apparatus as described in claim 9 wherein the per-container power usage is computed based on accumulated energy usages over a time window and using one or more models of energy usage.

11. The apparatus as described in claim 10 wherein the one or more models are one of: a core usage model, a package usage model, and a memory usage model.

12. The apparatus as described in claim 11 wherein the computer program instructions are further operative to model power consumption information for the host machine.

13. The apparatus as described in claim 8, wherein associating an amount of power consumption to a particular tenant facilitates an invoicing operation for the particular tenant's usage of the multi-tenant cloud compute system.

14. The apparatus as described in claim 8 the operating system kernel is Linux, and the read request is initiated from a Running Average Power Limit (RAPL) module that is modified to provide the collecting, computing and withholding.

15. A computer program product in a non-transitory computer readable medium for use in a multi-tenant cloud compute system host machine, the computer program product holding computer program instructions executed by host machine, the computer program instructions comprising program code configured to:
provide an operating system kernel that executes, as a native operating system virtualization method, a set of containers that share the operating system kernel;
configure the operating system kernel with a power management namespace that isolates and virtualizes system resources reflecting power consumption data;
using the power management namespace to defend the host machine against a power-based attack vector or to associate an amount of power consumption to a particular tenant by:
collecting per-container performance data and, for each container associated with the power management namespace, computing a per-container power usage; and
responsive to a read request initiated from a particular container and directed to a power consumption kernel module of the operating system, the power consumption kernel module being shared by each container in the set of containers, calibrating the per-container power usage computed from the per-container performance data against a model of host machine power consumption to generate a calibrated per-container power usage, the power consumption kernel module returning the calibrated per-container power usage for the particular container and withholding power consumption information about any other container in the set;
wherein power consumption information for the particular container is available to the particular container, but not any other container in the set.

16. The computer program product as described in claim 15 wherein the per-container performance data is collected from cpuacct and perf_event cgroups to approximate the per-container power usage.

17. The computer program product as described in claim 16 wherein the per-container power usage is computed based on accumulated energy usages over a time window and using one or more models of energy usage.

18. The computer program product as described in claim 17 wherein the one or more models are one of: a core usage model, a package usage model, and a memory usage model.

19. The computer program product as described in claim 18 wherein the computer program instructions are further operative to model power consumption information for the host machine.

20. The computer program product as described in claim 15, wherein associating an amount of power consumption to a particular tenant facilitates an invoicing operation for the particular tenant's usage of the multi-tenant cloud compute system.

\* \* \* \* \*